US012668669B2

(12) United States Patent
Wang et al.

(10) Patent No.: US 12,668,669 B2
(45) Date of Patent: Jun. 30, 2026

(54) METHOD FOR PREPARING CELLULOSE AND LIGNIN OIL BY DEPOLYMERIZING LIGNOCELLULOSE WITHOUT EXOGENOUS HYDROGEN

(71) Applicant: East China University of Science and Technology, Shanghai (CN)

(72) Inventors: Yanqin Wang, Shanghai (CN); Hao Zhou, Shanghai (CN); Yong Guo, Shanghai (CN); Xiaohui Liu, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 537 days.

(21) Appl. No.: 18/193,851

(22) Filed: Mar. 31, 2023

(65) Prior Publication Data

US 2024/0199820 A1 Jun. 20, 2024

Related U.S. Application Data

(63) Continuation of application No. PCT/CN2023/073712, filed on Jan. 29, 2023.

(30) Foreign Application Priority Data

Dec. 13, 2022 (CN) ......................... 202211625710.4

(51) Int. Cl.
*C08H 8/00* (2010.01)
*B01J 23/42* (2006.01)
(Continued)

(52) U.S. Cl.
CPC ................ *C08H 8/00* (2013.01); *B01J 23/42* (2013.01); *B01J 23/44* (2013.01); *B01J 23/462* (2013.01);
(Continued)

(58) Field of Classification Search
CPC ... C08H 8/00; B01J 23/40; B01J 23/42; B01J 23/44; B01J 23/46; B01J 23/462; B10J 23/44
See application file for complete search history.

(56) References Cited

U.S. PATENT DOCUMENTS

2013/0025191 A1 1/2013 Chen et al.
2017/0152278 A1* 6/2017 Samec ..................... C08H 6/00

FOREIGN PATENT DOCUMENTS

CN 103420798 A 12/2013
CN 103508857 A 1/2014
(Continued)

OTHER PUBLICATIONS

English machine translation of CN112479823, translated by Google Patents (Year: 2020).*
(Continued)

*Primary Examiner* — Andrea Olson
(74) *Attorney, Agent, or Firm* — Westbridge IP LLC

(57) ABSTRACT

Disclosed is a method for preparing cellulose and lignin oil by depolymerizing lignocellulose without exogenous hydrogen, including: performing reaction on the lignocellulose dispersed into an aqueous medium at 120° C. to 180° C. under the action of a catalyst; and separating a reaction product to obtain the cellulose and the lignin oil. The catalyst includes a carrier and an active ingredient loaded on the carrier, where the active ingredient is selected from one of platinum, palladium, ruthenium and nickel; the carrier is selected from one of a metal oxide, a metal composite material, silicon dioxide, nitrogen-doped carbon, molybdenum carbide and molybdenum nitride; and the metal oxide is selected from one of niobium oxide, tantalum oxide, tungsten oxide, zirconium oxide, aluminum oxide, titanium dioxide and molybdenum oxide.

6 Claims, 1 Drawing Sheet

(51) Int. Cl.

| | |
|---|---|
| ***B01J 23/44*** | (2006.01) |
| ***B01J 23/46*** | (2006.01) |
| ***B01J 23/56*** | (2006.01) |
| ***B01J 23/89*** | (2006.01) |
| ***C07G 1/00*** | (2011.01) |
| ***D21C 5/00*** | (2006.01) |

(52) U.S. Cl.

CPC ............. *B01J 23/56* (2013.01); *B01J 23/892* (2013.01); *C07G 1/00* (2013.01); *D21C 5/00* (2013.01)

(56) References Cited

FOREIGN PATENT DOCUMENTS

| | | | | | |
|---|---|---|---|---|---|
| CN | 104177228 | A | | 12/2014 | |
| CN | 108530404 | A | | 9/2018 | |
| CN | 109896922 | A | | 6/2019 | |
| CN | 111167447 | A | | 5/2020 | |
| CN | 112479823 | A | | 3/2021 | |
| CN | 114177930 | A | | 3/2022 | |
| FR | 3043676 | A1 | | 5/2017 | |
| IT | 202100005024 | A1 | * | 9/2022 | ............ B01J 23/462 |
| WO | 2012177138 | A1 | | 12/2012 | |
| WO | 2017084907 | A1 | | 5/2017 | |

OTHER PUBLICATIONS

English machine translation of IT-202100005024-A1, downloaded from worldwide.espacenet.com (Year: 2022).*

First Office Action issued in counterpart Chinese Patent Application No. 202211625710.4, dated Jan. 12, 2024.

International Search Report issued in corresponding PCT Application No. PCT/CN2023/073712, dated Apr. 12, 2023.

* cited by examiner

METHOD FOR PREPARING CELLULOSE AND LIGNIN OIL BY DEPOLYMERIZING LIGNOCELLULOSE WITHOUT EXOGENOUS HYDROGEN

CROSS-REFERENCE TO RELATED APPLICATIONS

This application is a continuation of International Application No. PCT/CN2023/073712, filed on Jan. 29, 2023, which claims priority to Chinese Patent Application No. 202211625710.4, filed on Dec. 13, 2022. All of the aforementioned applications are incorporated herein by reference in their entireties.

TECHNICAL FIELD

The present application relates to the technical field of carbon resource utilization, and in particular to a method for preparing cellulose and lignin oil by depolymerizing lignocellulose without exogenous hydrogen.

BACKGROUND

In recent years, due to the excessive dependence of human beings on fossil resources, energy shortage and environmental pollution have been caused, and the development and utilization of sustainable renewable energy is one of the urgent problems in the world today. Lignocellulose biomass is composed of cellulose, hemicellulose and lignin, and is the most abundant and sustainable green carbon resource on the earth. It is a very promising strategy to depolymerize the lignocellulose and convert the lignocellulose into clean energy that can be utilized by human beings. Among them, the depolymerization of the lignocellulose is crucial. The traditional method for depolymerizing the lignocellulose includes a sulfate method and a sulfite method, which are often used in pulping and papermaking industry. However, these technologies mainly aim at obtaining cellulose. The obtained lignin usually includes a large number of condensed carbon-carbon structures. These stubborn carbon-carbon bonds hinder the subsequent transformation and utilization of the lignin.

At present, the method for depolymerizing the lignocellulose usually requires hydrogen (CN107840783A, CN112209975A and CN110511116A), resulting in the waste of hydrogen energy; and the reaction temperature is usually above 200° C. (CN107840783A), resulting in high energy consumption.

Therefore, a more economical, simple, gentle and environmentally-friendly method for depolymerizing lignocellulose is urgently required.

SUMMARY

In view of this, an objective of the present application is to provide a method for preparing cellulose and lignin oil by depolymerizing lignocellulose without exogenous hydrogen.

Based on the above objective, the present application provides a method for preparing cellulose and lignin oil by depolymerizing lignocellulose without exogenous hydrogen. The method includes:

reacting the lignocellulose dispersed into an aqueous medium at 120° C. to 180° C. under the action of a catalyst; and separating a reaction product to obtain the cellulose and the lignin oil, wherein the catalyst includes a carrier and an active ingredient loaded on the carrier, where the active ingredient is selected from at least one of platinum, palladium, ruthenium and nickel; the carrier is selected from at least one of metal oxide, metal composite material, silicon dioxide, nitrogen-doped carbon, molybdenum carbide and molybdenum nitride; the metal oxide is selected from at least one of niobium oxide, tantalum oxide, tungsten oxide, zirconium oxide, aluminum oxide, titanium dioxide and molybdenum oxide; and the metal composite material is selected from at least one of a lanthanum nickel composite material, a magnesium aluminum composite material, a cobalt aluminum composite material, a zinc aluminum composite material, an iron aluminum composite material and a nickel aluminum composite material.

The depolymerization of lignocellulose to lignin oil and cellulose has extremely high requirements on the catalyst. Firstly, an appropriate catalyst is required to selectively perform aqueous phase reforming on a hemicellulose component in the lignocellulose to provide a hydrogen source; secondly, the catalyst has no activity on a cellulose component under an operating condition, that is, cellulose is selectively remained; finally, the catalyst needs to have the ability to depolymerize lignin into lignin oil, that is, to activate a C—O connecting bond widely present in the lignin. The conventional catalyst can easily destroy the cellulose component, that is, the cellulose is subjected to aqueous phase reforming, so that the retention rate of the cellulose is reduced, or the ability of depolymerizing the lignin component is low, resulting in reducing the yield of the lignin oil.

According to the present application, through the synergistic effect of the active ingredient metal in the catalyst and the carrier, the hemicellulose is subjected to high-selectivity aqueous phase reforming to provide the hydrogen source and the C—O connecting bond in the lignin is activated. The cellulose with the intact structure can be obtained, and the lignin oil yield close to a theoretical value can be obtained.

Therefore, the method provided by the present application has high selectivity, can perform aqueous phase reforming on the hemicellulose selectively, remains the cellulose, does not need to provide an additional hydrogen source, and is mild in reaction condition. Secondly, the C—O connecting bond in the lignin is activated, the yield of the lignin oil monomer is close to the theoretical maximum yield, and the lignin oil can serve as a raw material for producing fuel and has high additional value.

BRIEF DESCRIPTION OF THE DRAWINGS

To describe the technical solutions in the present application or the related art more clearly, the following briefly introduces the accompanying drawings required for describing the embodiments or the related art. Apparently, the accompanying drawings in the following descriptions are only some embodiments of the present application, and those having ordinary skill in the art may still derive other drawings from these drawings without creative efforts.

DETAILED DESCRIPTION OF THE EMBODIMENTS

To make the objectives, technical solutions and advantages of the present application clearer, the present application will be further described in detail below in conjunction with specific embodiments and with reference to the accompanying drawings.

It should be noted that, unless otherwise defined, technical terms or scientific terms used in the embodiments of the present application should have the ordinary meanings as understood by those having ordinary skill in the art to which the present application belongs. The terms "including" or "comprising" and the like are intended to indicate that elements or objects in front of the word encompass elements or objects listed after the word and their equivalents, but do not exclude another element or object.

In the related art, according to a method for depolymerizing lignocellulose, the lignocellulose can be selectively depolymerized into cellulose, hemicellulose and lignin-derived aromatic monomer, dimer and multimer. The hemicellulose runs through lignin and cellulose fibers for connecting the two. If an efficient catalytic system can be developed, the hemicellulose can be dissolved with high selectivity, the hydrogen source is provided through aqueous phase reforming, the cellulose is remained, and the C—O connecting bond in the lignin is activated to depolymerize the lignin into the lignin oil, thereby realizing more economical, simple, mild and environmentally-friendly depolymerization of the lignocellulose. However, no catalyst can achieve this challenging goal at present.

In view of this, an embodiment of the present application provides a method for preparing cellulose and lignin oil by depolymerizing lignocellulose without exogenous hydrogen. A metal-based catalyst is selected. The catalyst includes a carrier and an active ingredient loaded on the carrier, where the active ingredient is selected from at least one of platinum, palladium, ruthenium and nickel; and the carrier is selected from at least one of a metal oxide, a metal composite material, silicon dioxide, nitrogen-doped carbon, molybdenum carbide and molybdenum nitride. The metal catalyst can depolymerize the lignocellulose by using the own structural hydrogen of the lignocellulose, that is, hemicellulose can provide a hydrogen source through aqueous phase reforming, so that the cellulose and the lignin oil are prepared. By the method provided by the present application, reaction is performed at 120° C. to 180° C. without an additional hydrogen source. Mild reaction condition, green solvent, low cost and high safety are achieved. Meanwhile, the cellulose with an intact structure and the lignin oil with an approximately theoretical yield can be obtained, and the mass yield of the aromatic monomers in the lignin oil is above 42%.

Figure 1:
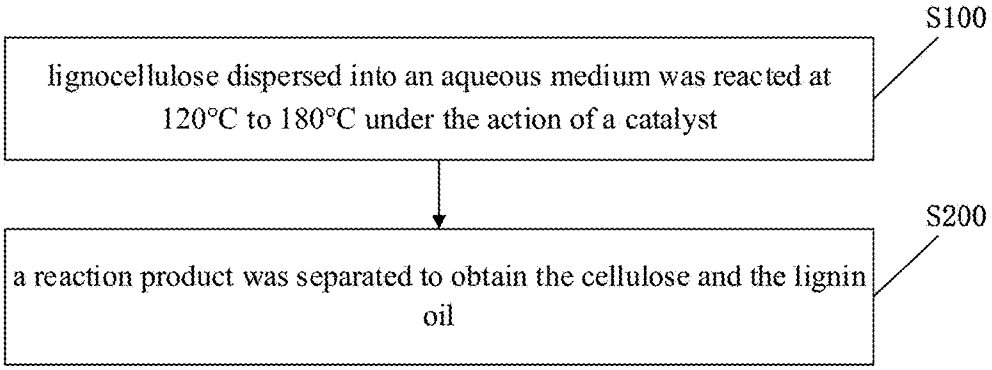
FIG. 1 shows a flow chart of preparing cellulose and lignin oil by depolymerizing lignocellulose without exogenous hydrogen according to some examples of the present disclosure.
Figure 2:
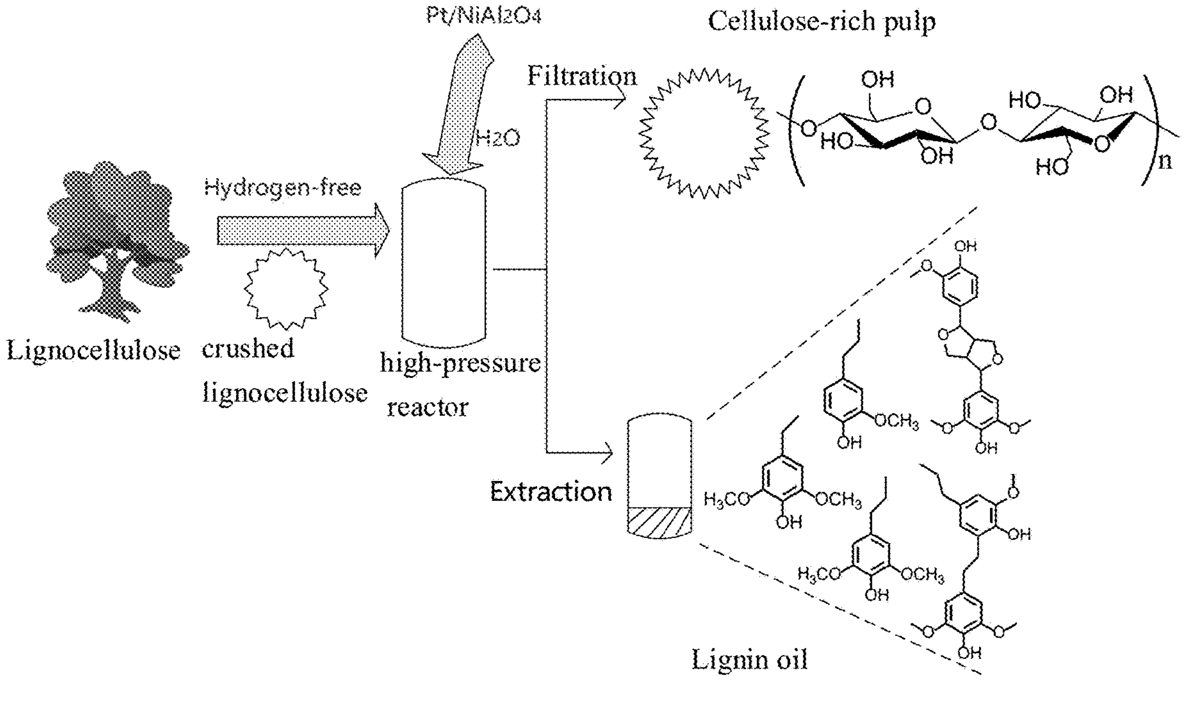
FIG. 2 is a schematic flowchart of a method for preparing cellulose and lignin oil by depolymerizing lignocellulose without exogenous hydrogen according to an embodiment of the present application.

Referring to FIG. 1 and FIG. 2, a method for preparing cellulose and lignin oil by depolymerizing lignocellulose without exogenous hydrogen includes:

Step S100: lignocellulose dispersed into an aqueous medium was reacted at 120° C. to 180° C. under the action of a catalyst. Generally, obtaining the lignocellulose dispersed into the aqueous medium may include the following steps:

the lignocellulose was crushed; and the crushed lignocellulose was dispersed into the aqueous medium.

In the above method, the lignocellulose may be a single type or may be a mixture of various types. For the mixture of various types, the mixing ratio may be any ratio, and depolymerizing lignocellulose without exogenous hydrogen can be realized under the same reaction conditions to preparing cellulose and lignin oil.

The lignocellulose may be a woody plant and/or a herbaceous plant. The lignocellulose may be the woody plant, for example, at least one of birch, beech, poplar, camphorwood, oak, Nanmu, Schima superba, walnut, Chinese oak, ironwood, maple, teak, pine, Chinese fir and cedarwood. The lignocellulose may be the herbaceous plant, for example, at least one of switchgrass, bamboo, wheat straw, rice straw and corn straw.

Preferably, the lignocellulose is selected from at least one of birch, poplar, pine, switchgrass and corn straw. Further, the lignocellulose is the birch.

The lignocellulose can be crushed until the lignocellulose is easily charged, for example, the size of the lignocellulose may be about 2 mm.

The solvent may include at least one selected from water, a mixture of water and cyclohexane, a mixture of water and dioxane, and a mixture of water and tetrahydrofuran. Preferably, the solvent may be water to better realize aqueous phase reforming. In the mixtures, the volume ratio of the water to the cyclohexane may be 1:1, the volume ratio of the water to the dioxane may be 1:1, and the volume ratio of the water to the tetrahydrofuran may be 1:1.

The mass concentration of the reactants is the mass percentage of the lignocellulose and the solvent, and may be 0.1% to 20%.

The weight ratio of the lignocellulose to the catalyst may be 1:(0.01-0.2), preferably, 1:(0.1-0.2).

In some embodiments, the reaction temperature may be 130° C. to 150° C., and the reaction retention time may be 2 to 30 hours. Preferably, the reaction retention time may be 10 to 20 hours.

The reaction is a batch or continuous reaction process, and the reactor is a tubular or tank reactor.

The catalyst includes a carrier and an active ingredient loaded on the carrier, where the active ingredient is selected from at least one of platinum (Pt), palladium (Pd), ruthenium (Ru), nickel (Ni) and alloy thereof. The alloy may be at least one of platinum ruthenium alloy (PtRu), platinum palladium alloy (PtPd), platinum nickel alloy (PtNi) and ruthenium nickel alloy (RuNi). The carrier is selected from at least one of a metal oxide, a metal composite material, silicon dioxide ($SiO_2$), nitrogen-doped carbon (C—N), molybdenum carbide ($Mo_2C$) and molybdenum nitride ($Mo_2N$). The metal oxide is selected from at least one of niobium oxide ($Nb_2O_5$), tantalum oxide ($Ta_2O_5$), tungsten oxide ($WO_3$), zirconium oxide ($ZrO_2$), aluminum oxide ($Al_2O_3$), titanium dioxide ($TiO_2$) and molybdenum oxide ($MoO_3$). The metal composite material is selected from at least one of a lanthanum nickel composite material ($La_2NiO_4$), a magnetism aluminum composite material ($MgAl_2O_4$), a cobalt aluminum composite material ($CoAl_2O_4$), a zinc aluminum composite material ($ZnAl_2O_4$), an iron aluminum composite material ($FeAl_2O_4$) and a nickel aluminum composite material ($NiAl_2O_4$).

In some embodiments, in the catalyst, the mass fraction of the active ingredient in the total amount of the catalyst is 0.5% to 5%. Excessively low or high mass fraction will affect the aqueous phase reforming activity of the catalyst and the selectivity to the hemicellulose.

Preferably, in the catalyst, the mass fraction of the active ingredient in the total amount of the catalyst is 2%, so that the catalyst can have preferable performance.

Generally, the preparation method of the catalyst may be a fractional step method, that is, a carrier is prepared first and then metal is loaded. The metal loading adopts an excessive impregnation method, a deposition sedimentation method and an equivalent-volume impregnation method, preferably, the equivalent-volume impregnation method. It should be understood that the excessive impregnation method, the deposition sedimentation method and the equivalent-volume impregnation method are all existing methods, and the embodiments of the present application do not relate to the improvement on the specific method.

In some embodiments, the active ingredient in the catalyst is platinum, and the carrier is selected from at least one of a nickel aluminum composite material, a magnesium aluminum composite material, a zinc aluminum composite material, a cobalt aluminum composite material, an iron aluminum composite material, molybdenum nitride, aluminum oxide, molybdenum carbide, molybdenum oxide, zirconium oxide, nitrogen-doped carbon, niobium oxide, titanium dioxide and tungsten oxide. Preferably, the lignocellulose may be the birch.

Further, the active ingredient in the catalyst is the platinum, and the carrier is selected from at least one of the nickel aluminum composite material, the magnesium aluminum composite material, the cobalt aluminum composite material, the zinc aluminum composite material, the iron aluminum composite material, the molybdenum nitride, the molybdenum carbide, the molybdenum oxide, the nitrogen-doped carbon, the zirconium oxide, the titanium dioxide, the niobium oxide and the tungsten oxide. Preferably, the lignocellulose may be the birch.

Further, the active ingredient in the catalyst is the platinum, and the carrier is selected from at least one of the nickel aluminum composite material, the magnesium aluminum composite material, the cobalt aluminum composite material, the zinc aluminum composite material, the iron aluminum composite material, the aluminum oxide, the molybdenum nitride, the molybdenum carbide, the nitrogen-doped carbon and the zirconium oxide. Preferably, the lignocellulose may be the birch.

Further, the active ingredient in the catalyst is the platinum, and the carrier is selected from at least one of the nickel aluminum composite material, the magnesium aluminum composite material, the zinc aluminum composite material, the cobalt aluminum composite material, the iron aluminum composite material, the molybdenum nitride, the aluminum oxide, the molybdenum carbide and the molybdenum oxide. Preferably, the lignocellulose may be the birch.

Further, the active ingredient in the catalyst is the platinum, and the carrier is selected from at least one of the nickel aluminum composite material, the magnesium aluminum composite material, the zinc aluminum composite material, the cobalt aluminum composite material and the iron aluminum composite material. Preferably, the lignocellulose may be the birch.

Further, the active ingredient in the catalyst is the platinum, and the carrier is selected from at least one of the magnesium aluminum composite material, the zinc aluminum composite material, the cobalt aluminum composite material and the nickel aluminum composite material. Preferably, the lignocellulose may be the birch.

Further, the active ingredient in the catalyst is the platinum, and the carrier is selected from the nickel aluminum composite material and the magnesium aluminum composite material. Preferably, the lignocellulose may be the birch.

Further, the active ingredient in the catalyst is platinum, and the carrier is selected from a nickel aluminum composite material. Preferably, the lignocellulose may be the birch.

In some embodiments, the active ingredient in the catalyst is selected from at least one of platinum ruthenium alloy, platinum palladium alloy, palladium, nickel, platinum nickel alloy, ruthenium nickel alloy and ruthenium, and the carrier is selected from a nickel aluminum composite material. Preferably, the lignocellulose may be the birch.

Further, the active ingredient in the catalyst is selected from at least one of the platinum ruthenium alloy, the platinum palladium alloy, the platinum, the platinum nickel alloy and the ruthenium nickel alloy; and the carrier is selected from the nickel aluminum composite material. Preferably, the lignocellulose may be the birch.

Further, the active ingredient in the catalyst is selected from at least one of the platinum ruthenium alloy and the platinum palladium alloy, and the carrier is selected from the nickel aluminum composite material.

Then in the step S200, a reaction product was separated to obtain the cellulose and the lignin oil. Generally, the reaction liquid can be extracted by ethyl acetate to obtain the lignin oil. The lignin oil is subjected to gas chromatograph-mass spectrometer analysis to obtain the component and content of each lignin oil monomer in the lignin oil. Generally, the reaction liquid is subjected to centrifugal separation, the precipitate is a mixture of cellulose and a catalyst, and the catalyst in the mixture can be separated through sieving. In this way, according to the method for preparing cellulose and lignin oil by depolymerizing lignocellulose without exogenous hydrogen provided by the embodiment of the present application, for the reaction product, the lignin oil can be obtained through simple extraction, the cellulose and the catalyst can be obtained through centrifugal separation, the catalyst can be obtained through further screening, and the advantage of convenient operation is achieved.

In some embodiments, the obtained catalyst can be reused. Carbon deposit on the surface of the catalyst can be removed through roasting treatment, for example, 500° C. roasting, so that the catalyst can be regenerated, the service life of the catalyst can be prolonged, the cost of the catalyst can be reduced, and the use efficiency of the catalyst can be improved.

The technical solution of the present application is further described below with reference to the specific embodiments.

The experimental methods in the following embodiments are conventional methods, unless otherwise specified.

The experimental materials used in the following embodiments were purchased from conventional biochemical reagent stores, unless otherwise specified.

Example 1

Experimental materials: lignocellulose: birch; lignocellulose: 0.5 g; solvent: water; mass of solvent: 10 g; substrate concentration: 5%;

catalyst: 2% $Pt/NiAl_2O_4$, where the active ingredient is Pt, the carrier is $NiAl_2O_4$, and the mass of the catalyst is 0.1 g;

experiment condition: a intermittent reactor; normal-pressure nitrogen; reaction temperature: 140° C.; reaction time: 12 h; and experimental method: 0.5 g of birch with a size of about 2 mm and 0.1 g of catalyst were thrown into a 50-mL stainless steel high-pressure reactor, water was added, sealing was performed, normal-pressure nitrogen was inflated, heating was performed to the required temperature 140° C. under rapid stirring, reaction was stopped after 12 hours, cooling and extracted were performed to obtain lignin oil, solid was centrifugally collected, sieving was performed to obtain a catalyst, and the residual solid part was cellulose.

Example 2

The difference from Example 1 is that the lignocellulose is poplar.

Example 3

The difference from Example 1 is that the lignocellulose is pine.

Example 4

The difference from Example 1 is that the lignocellulose is corn straw.

Example 5

The difference from Example 1 is that the lignocellulose is switchgrass.

Example 6

The difference from Example 1 is that the catalyst is 2% $Pd/NiAl_2O_4$.

Example 7

The difference from Example 1 is that the catalyst is 2% $Ru/NiAl_2O_4$.

Example 8

The difference from Example 1 is that the catalyst is 2% $Pt/Al_2O_3$.

Example 9

The difference from Example 1 is that the catalyst is 2% $Pt/Nb_2O_5$.

Example 10

The difference from Example 1 is that the catalyst is 2% $Pt/MgAl_2O_4$.

Example 11

The difference from Example 1 is that the catalyst is 2% $Pt/ZnAl_2O_4$.

Example 12

The difference from Example 1 is that the catalyst is 2% $Pt/CoAl_2O_4$.

Example 13

The difference from Example 1 is that the catalyst is 2% $Pt/FeAl_2O_4$.

Example 14

The difference from Example 1 is that the catalyst is 2% $PtNi/NiAl_2O_4$.

Example 15

The difference from Example 1 is that the catalyst is 2% $PtRu/NiAl_2O_4$.

Example 16

The difference from Example 1 is that the catalyst is 2% $PtPd/NiAl_2O_4$.

Example 17

The difference from Example 1 is that the catalyst is 2% $RuNi/NiAl_2O_4$.

Example 18

The difference from Example 1 is that the catalyst is 2% $Pt/WO_3$.

Example 19

The difference from Example 1 is that the catalyst is 2% $Pt/ZrO_2$.

Example 20

The difference from Example 1 is that the catalyst is 2% $Pt/TiO_2$.

Example 21

The difference from Example 1 is that the catalyst is 2% Pt/C—N.

Example 22

The difference from Example 1 is that the catalyst is 2% $Pt/Mo_2C$.

Example 23

The difference from Example 1 is that the catalyst is 2% $Pt/Mo_2N$.

Example 24

The difference from Example 1 is that the catalyst is 2% $Pt/MoO_3$.

Example 25

The difference from Example 1 is that the reaction temperature is 120° C. and the reaction time is 12 h.

Example 26

The difference from Example 1 is that the reaction temperature is 180° C. and the reaction time is 12 h.

Example 27

The difference from Example 1 is that the lignocellulose: 0.25 g, and the substrate concentration: 2.5%.

Example 28

The difference from Example 1 is that the lignocellulose: 0.025 g, and the substrate concentration: 0.25%.

Example 29

The difference from Example 1 is that the solvent is a mixture of water and cyclohexane, and the ratio of the water to the cyclohexane is 1:1.

Example 30

The difference from Example 1 is that the solvent is a mixture of water and dioxane, and the ratio of the water to the dioxane is 1:1.

Example 31

The difference from Example 1 is that the solvent is a mixture of water and tetrahydrofuran, and the ratio of the water to the tetrahydrofuran is 1:1.

Comparative Example 1

The difference from Example 1 is that the catalyst is 2% Pt/C.

Comparative Example 2

The difference from Example 1 is that the catalyst is 2% $Fe/NiAl_2O_4$.

Comparative Example 3

The difference from Example 1 is that the catalyst is 2% $Co/NiAl_2O_4$.

Comparative Example 4

The difference from Example 1 is that the solvent is methanol.

Comparative Example 5

The difference from Example 1 is that the active ingredient is Ag.

Comparative Example 6

The difference from Example 1 is that the active ingredient is Au.

Result analysis: the lignin oil is subjected to GC-MS (Agilent 7890A) and GC (Agileent 7890B) qualitative and quantitative analysis. A detector is a flame ionization detector (provided with an HP-5 capillary column), and tridecane is used as an internal standard for liquid product quantitation.

The contents of cellulose, hemicellulose and lignin in biomass are measured by a Klason method, and the mole number of the monomer in the lignin is measured by an NBO method. The theoretical value (that is, the lignin content of the birch) of the mass yield of the lignin oil in the birch is about 23%, and the mass yield of the lignin oil in the birch divided by the lignin content (the value is 23%) of the lignocellulose is the extraction rate of the lignin oil in the birch. The theoretical value (that is, the lignin content of the poplar) of the mass yield of the lignin oil in the poplar is about 24%, and the mass yield of the lignin oil in the poplar divided by the lignin content (the value is 24%) of the lignocellulose is the extraction rate of the lignin oil in the poplar. The theoretical value (that is, the lignin content of the pine) of the mass yield of the lignin oil in the pine is about 29%, and the mass yield of the lignin oil in the pine divided by the lignin content (the value is 29%) of the lignocellulose is the extraction rate of the lignin oil in the pine. The theoretical value (that is, the lignin content of the corn straw) of the mass yield of the lignin oil in the corn straw is about 19%, and the mass yield of the lignin oil in the corn straw divided by the lignin content (the value is 19%) of the lignocellulose is the extraction rate of the lignin oil in the corn straw. The theoretical value (that is, the lignin content of the switchgrass) of the mass yield of the lignin oil in the switchgrass is about 18%, and the mass yield of the lignin oil in the switchgrass divided by the lignin content (the value is 18% of the lignocellulose is the extraction rate of the lignin oil in the switchgrass.

The specific calculation method of the product yield is as follows:

$$\text{Sugar retention (wt \%)} = \frac{\text{Mass(Sugar in pulp)}}{\text{Mass(Sugar in sawdust)}} \times 100\%$$

$$\text{Lignin oil (wt \%)} = \frac{\text{Mass of the oil produced}}{\text{Mass of the lignocellulosic biomass}} \times 100\%$$

$$\text{Phenolic monomers (wt \%)} = \frac{\text{Mass(total monomers)}}{\text{Mass(Klason lignin)}} \times 100\%$$

$$\text{Mole yields of monomers (\%)} = \frac{\text{Mole(total monomers)}}{\text{Mole(all monomers in lignin)}} \times 100\%$$

The test results are shown in Table 1 and Table 2.

TABLE 1

Mass yield of aromatic monomers in lignin oil obtained by depolymerizing different lignocellulose under the action of different catalysts without exogenous hydrogen

| | Mass yield % of aromatic monomers in lignin oil | | | | |
|---|---|---|---|---|---|
| Examples | 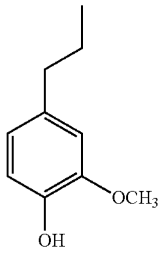 | 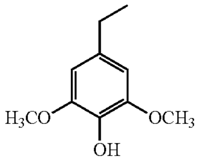 | 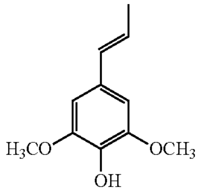 | 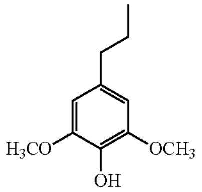 | 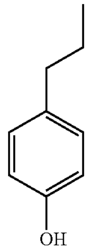 |
| Example 1 | 8 | 9 | 2 | 28 | 2 |
| Example 2 | 7 | 1 | 2 | 25 | 4 |
| Example 3 | 15 | 0 | 0 | 0 | 0 |
| Example 4 | 4 | 1 | 3 | 12 | 4 |
| Example 5 | 3 | 2 | 3 | 13 | 3 |
| Example 6 | 7 | 6 | 19 | 7 | 1 |
| Example 7 | 3 | 2 | 10 | 12 | 2 |
| Example 8 | 8 | 3 | 12 | 16 | 1 |
| Example 9 | 3 | 0 | 5 | 12 | 2 |
| Example 10 | 6 | 8 | 1 | 27 | 1 |
| Example 11 | 7 | 5 | 2 | 26 | 2 |
| Example 12 | 6 | 4 | 4 | 27 | 2 |
| Example 13 | 5 | 7 | 2 | 25 | 0 |
| Example 14 | 6 | 7 | 3 | 19 | 1 |
| Example 15 | 8 | 8 | 3 | 22 | 2 |
| Example 16 | 7 | 9 | 2 | 20 | 2 |
| Example 17 | 5 | 6 | 3 | 23 | 0 |
| Example 18 | 3 | 2 | 4 | 12 | 1 |
| Example 19 | 4 | 1 | 5 | 13 | 2 |
| Example 20 | 5 | 2 | 3 | 14 | 2 |
| Example 21 | 4 | 3 | 4 | 13 | 1 |
| Example 22 | 6 | 2 | 5 | 18 | 2 |
| Example 23 | 5 | 3 | 2 | 17 | 2 |
| Example 24 | 3 | 1 | 3 | 17 | 2 |
| Example 25 | 3 | 3 | 1 | 19 | 1 |
| Example 26 | 8 | 8 | 1 | 30 | 2 |
| Example 27 | 8 | 9 | 1 | 29 | 2 |
| Example 28 | 8 | 9 | 2 | 29 | 1 |
| Example 29 | 3 | 1 | 4 | 13 | 2 |
| Example 30 | 2 | 1 | 6 | 13 | 2 |
| Example 31 | 2 | 1 | 5 | 10 | 2 |
| Comparative example 1 | 0 | 0 | 1 | 0 | 0 |
| Comparative example 2 | 1 | 0 | 1 | 1 | 0 |
| Comparative example 3 | 1 | 1 | 1 | 2 | 0 |
| Comparative example 4 | 1 | 0 | 1 | 2 | 0 |
| Comparative example 5 | 1 | 0 | 1 | 1 | 0 |
| Comparative example 6 | 1 | 0 | 1 | 2 | 0 |

TABLE 2

Mass yield of aromatic monomers in lignin oil obtained by depolymerizing different lignocellulose under the action of different catalysts without exogenous hydrogen

| Active ingredient | Carrier | Examples | Mass Yield % of Lignin Oil | Extraction Rate % of Lignin Oil | Retention rate % of cellulose |
|---|---|---|---|---|---|
| Pt | $NiAl_2O_4$ | Example 1 | 23 | 100 | 95 |
| Pt | $NiAl_2O_4$ | Example 2 | 22 | 91.7 | 93 |
| Pt | $NiAl_2O_4$ | Example 3 | 20 | 69.0 | 92 |
| Pt | $NiAl_2O_4$ | Example 4 | 15 | 78.9 | 93 |

TABLE 2-continued

Mass yield of aromatic monomers in lignin oil obtained by depolymerizing different lignocellulose under the action of different catalysts without exogenous hydrogen

| Active ingredient | Carrier | Examples | Mass Yield % of Lignin Oil | Extraction Rate % of Lignin Oil | Retention rate % of cellulose |
|---|---|---|---|---|---|
| Pt | $NiAl_2O_4$ | Example 5 | 15 | 83.3 | 94 |
| Pt | $NiAl_2O_4$ | Example 6 | 20 | 87.0 | 91 |
| Pd | $NiAl_2O_4$ | Example 7 | 18 | 78.3 | 90 |
| Ru | $NiAl_2O_4$ | Example 8 | 18 | 78.3 | 91 |

TABLE 2-continued

Mass yield of aromatic monomers in lignin oil obtained by depolymerizing different lignocellulose under the action of different catalysts without exogenous hydrogen

| Active ingredient | Carrier | Examples | Mass Yield % of Lignin Oil | Extraction Rate % of Lignin Oil | Retention rate % of cellulose |
|---|---|---|---|---|---|
| Pt | $Al_2O_3$ | Example 9 | 15 | 65.2 | 90 |
| Pt | $Nb_2O_5$ | Example 10 | 23 | 99 | 94 |
| Pt | $MgAl_2O_4$ | Example 11 | 22 | 95.7 | 94 |
| Pt | $ZnAl_2O_4$ | Example 12 | 22 | 95.7 | 94 |
| Pt | $CoAl_2O_4$ | Example 13 | 21 | 91.3 | 91 |
| Pt | $FeAl_2O_4$ | Example 14 | 20 | 87.0 | 91 |
| PtNi | $NiAl_2O_4$ | Example 15 | 21 | 91.3 | 90 |
| PtRu | $NiAl_2O_4$ | Example 16 | 21 | 91.3 | 93 |
| PtPd | $NiAl_2O_4$ | Example 17 | 20 | 87.0 | 92 |
| RuNi | $NiAl_2O_4$ | Example 18 | 15 | 65.2 | 90 |
| Pt | $WO_3$ | Example 19 | 16 | 69.6 | 91 |
| Pt | $ZrO_2$ | Example 20 | 15 | 65.2 | 91 |
| Pt | $TiO_2$ | Example 21 | 16 | 69.6 | 92 |
| Pt | C—N | Example 22 | 18 | 78.3 | 91 |
| Pt | $Mo_2C$ | Example 23 | 19 | 82.6 | 91 |
| Pt | $Mo_2N$ | Example 24 | 18 | 78.3 | 91 |
| Pt | $MoO_3$ | Example 25 | 18 | 78.3 | 95 |
| Pt | $NiAl_2O_4$ | Example 26 | 23 | 100 | 80 |
| Pt | $NiAl_2O_4$ | Example 27 | 23 | 100 | 95 |
| Pt | $NiAl_2O_4$ | Example 28 | 23 | 100 | 95 |
| Pt | $NiAl_2O_4$ | Example 29 | 15 | 65.2 | 95 |
| Pt | $NiAl_2O_4$ | Example 30 | 15 | 65.2 | 96 |
| Pt | $NiAl_2O_4$ | Example 31 | 16 | 69.6 | 95 |
| Pt | C | Comparative example 1 | 2 | 8.7 | 92 |
| Fe | $NiAl_2O_4$ | Comparative example 2 | 5 | 21.7 | 92 |
| Co | $NiAl_2O_4$ | Comparative example 3 | 8 | 34.8 | 93 |
| Pt | $NiAl_2O_4$ | Comparative example 4 | 4 | 17.4 | 93 |
| Ag | $NiAl_2O_4$ | Comparative example 5 | 5 | 21.7 | 93 |
| Au | $NiAl_2O_4$ | Comparative example 6 | 4 | 17.4 | 95 |

It can be seen in Example 1 to Example 31 that when the lignocellulose is one of birch, poplar, pine, switchgrass and corn straw, the active ingredient in the catalyst is platinum; and the carrier is selected from at least one of a nickel aluminum composite material, a magnesium aluminum composite material, a zinc aluminum composite material, a cobalt aluminum composite material, an iron aluminum composite material, molybdenum nitride, aluminum oxide, molybdenum carbide, molybdenum oxide, zirconium oxide, nitrogen-doped carbon, niobium oxide, titanium dioxide and tungsten oxide. Preferably, the lignocellulose may be the birch. When the reaction temperature is 120° C. to 180° C., the mass yield of the lignin oil is up to above 15%, the mass rate of the monomer in the lignin oil is above 20%, and the retention rate of the cellulose is above 80%.

When the lignocellulose is the birch, the active ingredient in the catalyst is platinum. When the carrier is selected from a nickel aluminum composite material, a magnesium aluminum composite material, a cobalt aluminum composite material, a zinc aluminum composite material, an iron aluminum composite material, molybdenum nitride, molybdenum carbide, molybdenum oxide, zirconium oxide, nitrogen-doped carbon, niobium oxide, titanium dioxide or tungsten oxide and the reaction temperature is 140° C., the mass yield of the lignin oil is up to above 15%, and the retention rate of the cellulose is above 90%.

When the lignocellulose is the birch, the active ingredient in the catalyst is platinum. When the carrier is selected from a nickel aluminum composite material, a magnesium aluminum composite material, a zinc aluminum composite material, a cobalt aluminum composite material, an iron aluminum composite material, molybdenum nitride, aluminum oxide, molybdenum carbide or molybdenum oxide, the extraction rate of the lignin oil is above 78.3%, and the mass yield of the lignin oil is above 18%.

When the lignocellulose is the birch, the active ingredient in the catalyst is platinum. When the carrier is selected from a nickel aluminum composite material, a magnesium aluminum composite material, a zinc aluminum composite material, a cobalt aluminum composite material or an iron aluminum composite material, the extraction rate of the lignin oil is above 91.3%, and the mass yield of the lignin oil is above 21%.

When the lignocellulose is the birch, the active ingredient in the catalyst is platinum. When the carrier is selected from a magnesium aluminum composite material, a zinc aluminum composite material, a cobalt aluminum composite material or a nickel aluminum composite material, the extraction rate of the lignin oil is above 95.7%, and the mass yield of the lignin oil is above 22%.

When the lignocellulose is the birch, the active ingredient in the catalyst is platinum, and the carrier is selected from a nickel aluminum composite material and a magnesium aluminum composite material, the mass yield of the lignin oil is close to a theoretical value.

When the lignocellulose is the birch, the active ingredient in the catalyst is selected from platinum ruthenium alloy, platinum palladium alloy, palladium, platinum nickel alloy, ruthenium nickel alloy or ruthenium, and the carrier is selected from a nickel aluminum composite material, the extraction rate of the lignin oil is above 78.3%, and the mass yield of the lignin oil is above 18%.

When the lignocellulose is the birch, the active ingredient in the catalyst is selected from platinum ruthenium alloy, platinum palladium alloy, palladium, platinum nickel alloy or ruthenium nickel alloy, and the carrier is selected from a nickel aluminum composite material, the extraction rate of the lignin oil is above 87%, and the mass yield of the lignin oil is above 20%.

When the lignocellulose is the birch, the active ingredient in the catalyst is selected from platinum ruthenium alloy or platinum palladium alloy, and the carrier is selected from a nickel aluminum composite material, the extraction rate of the lignin oil is above 91.3%, and the mass yield of the lignin oil is above 21%.

Those having ordinary skill in the art should understand: the discussion of any of the above embodiments is exemplary only and is not intended to imply that the scope of the present disclosure (including the claims) is limited to these examples; and in the idea of the present disclosure, technical features in the above embodiments or different embodiments may also be combined, steps may be implemented in any order, and many other variations of different aspects of the present disclosure as described above, which are not provided in detail for the sake of brevity, are available.

The present disclosure has been described with reference to the specific embodiments of the present disclosure, but many replacements, modifications and variations of these embodiments will be obvious to those having ordinary skill in the art according to the above description.

The embodiments of the present disclosure are intended to cover all such substitutions, modifications and variations that fall within the broad scope of the claims. Therefore, any omission, modification, equivalent replacement, improvement, etc. made within the spirit and principles of the embodiments of the present disclosure should be included in the scope of protection of the present disclosure.

What is claimed is:

1. A method for preparing cellulose and lignin oil by depolymerizing lignocellulose without exogenous hydrogen, comprising:

reacting the lignocellulose dispersed into water at 120° C. to 180° C. under the action of a catalyst; wherein the weight ratio of the lignocellulose to the catalyst is 1:(0.01-0.2); and separating a reaction product to obtain the cellulose and the lignin oil, wherein the catalyst comprises a carrier and an active ingredient supported on the carrier; wherein in the catalyst, the mass fraction of the active ingredient in the total amount of the catalyst is 0.5% to 5%; wherein, through the synergistic effect of the active ingredient metal in the catalyst and the carrier, the hemicellulose undergoes highly selective aqueous-phase reforming to provide the hydrogen source;

wherein the active ingredient in the catalyst is platinum; and the carrier comprises at least one of a nickel aluminum composite material, a magnesium aluminum composite material, a zinc aluminum composite material, a cobalt aluminum composite material, and an iron aluminum composite material.

2. The method according to claim 1, wherein the lignocellulose comprises at least one of a woody plant and a herbaceous plant; the woody plant comprises at least one of birch, beech, poplar, camphorwood, oak, Nanmu, Schima superba, walnut, Chinese oak, ironwood, maple, teak, pine, Chinese fir and cedarwood; and the herbaceous plant comprises at least one of switchgrass, bamboo, wheat straw, rice straw and corn straw.

3. The method according to claim 1, wherein the lignocellulose comprises at least one of birch, poplar, pine, switchgrass and corn straw.

4. The method according to claim 1, wherein the active ingredient in the catalyst is the platinum, and the carrier comprises at least one of the magnesium aluminum composite material, the zinc aluminum composite material, the cobalt aluminum composite material and the nickel aluminum composite material.

5. The method according to claim 4, wherein the active ingredient in the catalyst is the platinum, and the carrier is selected from the nickel aluminum composite material and the magnesium aluminum composite material.

6. The method according to claim 1, the reaction temperature is 130° C. to 150° C.; and the reaction retention time is 2 to 30 hours.

* * * * *